Arlie I. Zumwalt
INVENTOR.

United States Patent Office 2,762,621
Patented Sept. 11, 1956

2,762,621
PIPE CUTTING APPARATUS
Arlie I. Zumwalt, Tulsa, Okla.

Application August 28, 1952, Serial No. 306,755

3 Claims. (Cl. 266—23)

The invention relates to pipe cutting apparatus and particularly to a device of this kind adapted to be supported on a pipe, and provided with a torch block, which torch block may be moved in a stationary frame so a torch, carried by the block, may be utilized for cutting rectangular samples from the pipe across a weld joint. The samples are taken from the welded pipe for test in a pull machine for testing the weld.

A further object is to slidably mount the torch block on the frame of the apparatus in a manner whereby said block and the torch carried thereby may be moved longitudinally or transversely in relation to the pipe for cutting a sample from the pipe.

A further object is to provide a sample cutting apparatus comprising a stationary frame mounted on a pipe, a traveller block slidably mounted on guide rods connecting the end brackets of the frame, a feed screw rotatably mounted in the frame and threaded through the traveller block, guide rods transversely disposed and carried by the traveller block, and a rotatable feed screw extending through the traveller block, and threaded through the torch block, and by means of which the torch block may be transversely positioned as desired in relation to the axis of the pipe.

A further object is to position the traveller block and its guide rods to one side of a vertical longitudinal plane extending through the pipe so the rectangularly shaped sample may be cut from the upper side of the pipe.

A further object is to provide adjustable stop collars on the feed screws for limiting the longitudinal movement of the traveller block and torch block, as well as the transverse movement of the torch block.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 5:
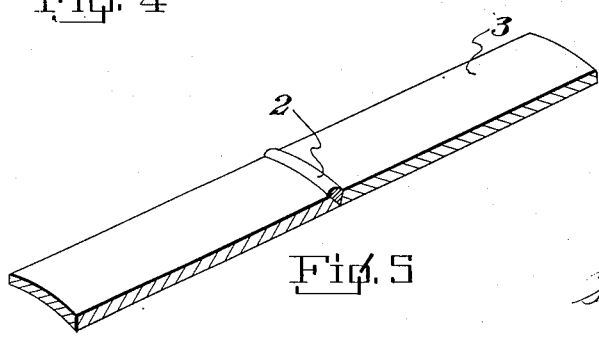
Figure 5 is a perspective view of an oblong sample cut from the pipe for test purposes.

Referring to the drawings, the numeral 1 designates adjacent pipe ends, circumferentially welded as at 2. The pipes are relatively large, for example, those used in oil and gas industries and it is necessary to test, from time to time, the welds 2 in a pulling machine, and this is done by cutting samples 3, from the pipe ends, and extending across the weld. Such a sample is shown in Figure 5.

The sample cutting apparatus comprises a rigid frame having end brackets 4 of general Y-shape with downwardly diverging arms 5 for resting on the upper periphery of the pipe ends 1. The other arms of the brackets 4, designated by the numeral 6, are vertically disposed and off-set to one side of a vertical plane extending through the longitudinal axis of the pipe ends, so the sample may be cut from the upper side of the pipe ends, across the weld, and on opposite sides of said vertical plane. The downwardly diverging arms 5 are connected together by tie rods 7 so a rigid structure is formed, and mounted on the tie rods 7 are downwardly diverging hard steel blocks 8, engaging the periphery of the pipe ends, and being hardened, resist wear from use of the device.

The frame is held in adjusted positions on the pipe end by means of a contractible band 9 having a conventional form of toggle tightener 10. It will be understood that any kind of holding means may be used.

Rigidly connecting the upwardly extending arms 6 of the end brackets 4 are upper and lower guide rods 11 and 12. It will be noted that these rods are in a vertical plane. Slidably mounted on the guide rods 11 and 12 is a traveller block 13, and the traveller block is longitudinally moved on the guide rods 11 and 12 by means of rotatable feed screw 14, which feed screw is threaded through the traveller block 13, and the limit of movement of the traveller block 13 may be regulated by adjustable stop collars 15, mounted on the feed screw 14. One end of the feed screw 14 is provided with a hand crank 16, by means of which crank the traveller block may be longitudinally moved in either direction as desired.

Figure 1:
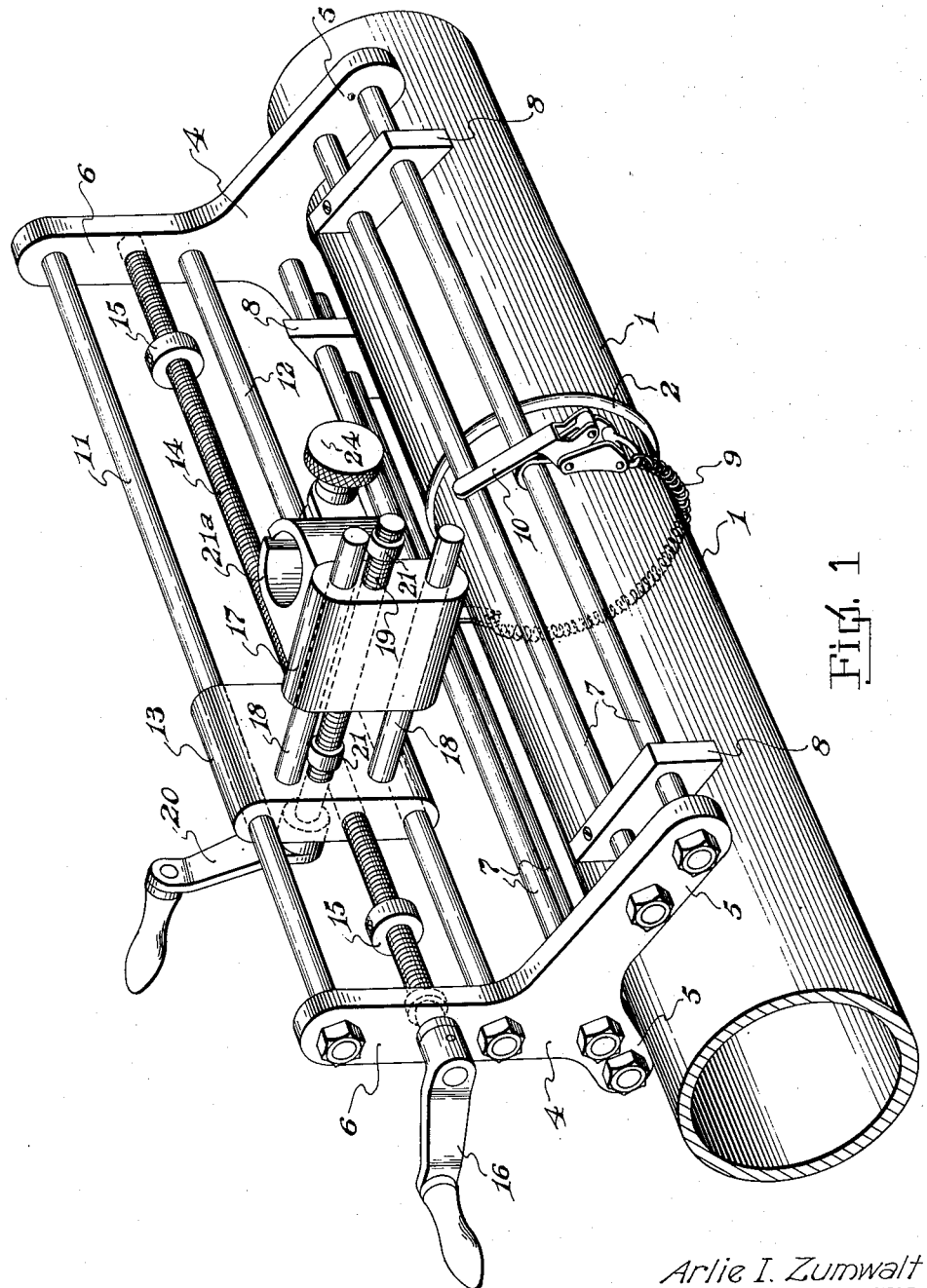
Figure 1 is a perspective view of the apparatus, showing the apparatus applied to the upper side of a pipe, the torch being eliminated for purposes of clearness.
Figure 2:
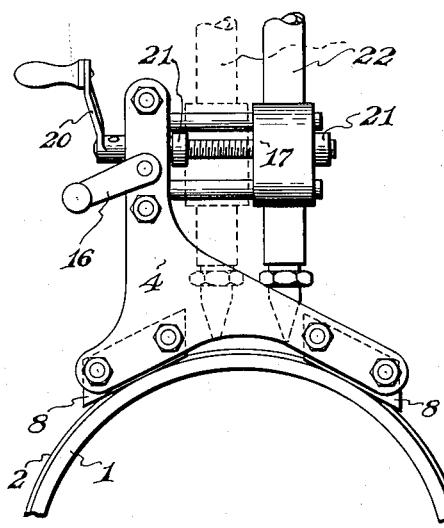
Figure 2 is an end view of the apparatus showing the apparatus supported on a pipe.
Figure 3:
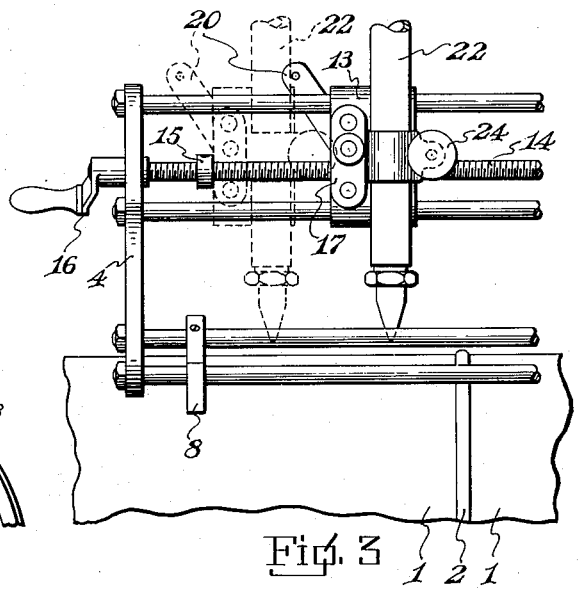
Figure 3 is an end elevational view of the apparatus.

Extending outwardly from the inner side of the traveller block 13 is a torch carrying block 17, and the torch block is slidably mounted on spaced guide rods 18, which guide rods are in parallel relation as shown in Figure 1. Torch block 17 is moved transversely across the pipe by means of a feed screw 19, threaded through the block 17. The feed 19 is rotatable in the traveller block 13 and is provided with a hand lever 20 so the operator can move the torch block inwardly or outwardly between the adjustable stop collars 21 on the feed screw 19. One side of the torch block is provided with a contractible collar 21ª, in which collar a conventional form of torch 22 is clamped in a vertical position as shown in Figures 2 and 3. The collar is contracted by the knurled screw 24.

Figure 4:
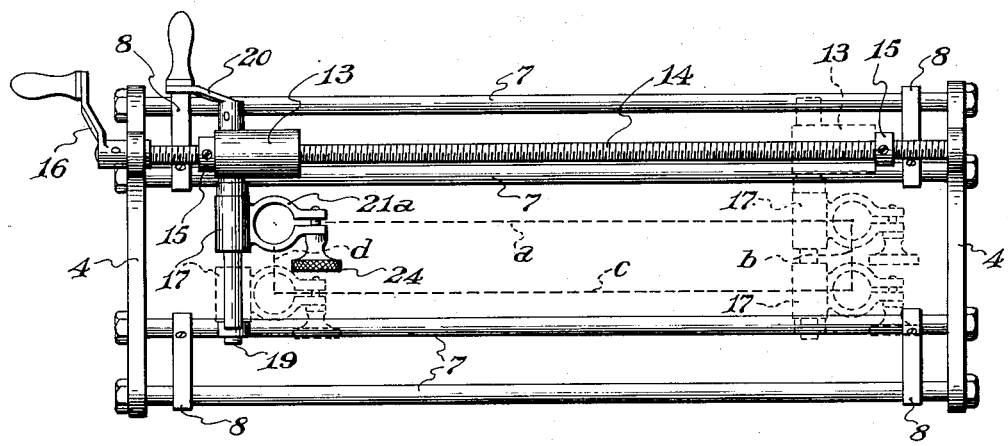
Figure 4 is a top plan view of the apparatus, showing, in dotted lines, the positions assumed by the torch in cutting a sample from the pipe, and also eliminating the upper guide rod of the carriage for purposes of clearness.

In the use of the device, the traveller is placed in the position shown in Figure 4, then the longitudinal feed screw 14 is rotated for moving the torch longitudinally on the line a. When the traveller is stopped by the stop member 15, the torch can then be transversely moved on the line b by rotating the transverse feed screw 19. After the torch has been moved the desired distance, the transverse movement is stopped, and then the torch axis moves along the line c until it reaches the left hand side, as shown in Figure 4, and then the transverse feed screw is rotated to move the torch along the line d, all positions being shown in Figure 4. It will be noted that an oblong sample has been cut from the upper side of the pipe, and this sample is then placed in a testing machine, for testing the weld. Such a sample is shown in Figure 5.

From the above it will be seen that a torch holding and travelling device is provided, by means of which samples of various shape can be cut from a pipe or other object. It will also be seen that the device is simple in construction and may be easily mounted on a pipe for the cutting operation.

The invention having been set forth what is claimed as new and useful is:

1. A cutting device of the type described comprising a pair of spaced apart arched arms, said arms being adapted to overlie a portion of the circumference on the upper sides of a pair of pipes which are welded in end to end relation, longitudinally extending rods connected between the arms to the end portions thereof and maintaining the arms in fixed spaced relation, flexible means carried by the rods and adapted to encircle one of the pipes to mount the arms on the upper sides of the pipes, an integral supporting bar element upstanding from each of the arms adjacent one of the ends thereof and disposed in a vertical plane parallel to and spaced laterally from the vertical center line of the pipes, vertically spaced longitudinal guide rods connecting said bar elements, a screw rod journalled at its ends in the bracket elements and disposed between the guide rods, a traveller block slidably mounted on the guide rods and threaded on the screw rod for forced movement longitudinally on the guide rods, means for rotating the screw rod, adjustable means carried by the screw rod for limiting the longitudinal movement of the traveller block, a pair of vertically spaced supporting rods laterally outstanding from the traveller block and horizontally overlying the pipes and extending beyond the center line of the pipes, a torch block slidably mounted on the supporting rods, a second screw rod rotatably supported by the traveller block and positioned between the supporting rods in threaded engagement with the torch block, means for rotating the second screw rod to move the torch block axially of the supporting rods and transversely of the path of movement of the traveller block and means carried by the torch block for supporting a torch in a position depending from the torch block.

2. A cutting device as claimed in claim 1, wherein hard steel pipe engaging blocks are carried by the connecting rods and brace the connecting rods on the pipes.

3. A cutting device as claimed in claim 1, wherein said means limiting the movement of the traveller block includes collars adjustably circumposed on the screw rod.

References Cited in the file of this patent
UNITED STATES PATENTS

| | | |
|---|---|---|
| 1,752,690 | Ost | Apr. 1, 1930 |
| 2,107,396 | Schoitz | Feb. 8, 1938 |
| 2,575,737 | Tyrner | Nov. 20, 1951 |
| 2,582,011 | Cunningham | Jan. 8, 1952 |